April 5, 1966 C. V. FOGELBERG ETAL 3,243,847
APPARATUS FOR BLOW MOLDING HOLLOW PLASTIC ARTICLES
Filed March 25, 1963 6 Sheets-Sheet 1

INVENTORS
CLEMENT V. FOGELBERG
WILLIAM D. HOUGH
BY
ATTORNEY

INVENTORS
CLEMENT V. FOGELBERG
WILLIAM D. HOUGH
BY
ATTORNEY

April 5, 1966 C. V. FOGELBERG ETAL 3,243,847
APPARATUS FOR BLOW MOLDING HOLLOW PLASTIC ARTICLES
Filed March 25, 1963 6 Sheets-Sheet 3

INVENTORS
CLEMENT V. FOGELBERG
WILLIAM D. HOUGH
BY
ATTORNEY

*INVENTORS*
CLEMENT V. FOGELBERG
WILLIAM D. HOUGH
ATTORNEY

April 5, 1966   C. V. FOGELBERG ETAL   3,243,847
APPARATUS FOR BLOW MOLDING HOLLOW PLASTIC ARTICLES
Filed March 25, 1963   6 Sheets-Sheet 6

INVENTORS
CLEMENT V. FOGELBERG
WILLIAM D. HOUGH
BY
ATTORNEY

United States Patent Office 3,243,847
Patented Apr. 5, 1966

3,243,847
APPARATUS FOR BLOW MOLDING HOLLOW PLASTIC ARTICLES
Clement V. Fogelberg, Boulder, and William D. Hough, Denver, Colo., assignors to Ball Brothers Company Incorporated, Muncie, Ind., a corporation of Indiana
Filed Mar. 25, 1963, Ser. No. 268,517
10 Claims. (Cl. 18—5)

This invention pertains to a new and improved apparatus for manufacturing hollow articles such as containers or bottlers from plastic materials and more particularly to an improved method and apparatus for blow molding such articles.

One of the problems with apparatus heretofore employed to produce hollow plastic articles in a continuous production operation is the inability to effectively utilize the high extrusion rates of commercially available extruders. This problem arises chiefly because of the difficulties encountered in attempting to precisely and quickly sever and remove parisons from an extruder during continuous extrusion, to rapidly transfer the parisons to one of a series of mold stations located around the extruder, and to accurately position the parisons within the molds. Attempts have been made to overcome these difficulties through the use of a plurality of molds secured to a large rotating mold platform and positioned so that each mold receives a parison as it passes the extrusion nozzle. Also, it has been suggested to employ stationary molds in conjunction with a movable extruder or extruder nozzle which moves successively from one mold to another.

However, each of the above systems has certain inherent disadvantages. Among these are the difficulties of quickly moving and precisely aligning the large components of the apparatus, such as the mold or molds and the extruder, to insure proper positioning of the parison within the mold prior to the application of fluid pressure. As a result, users of the above systems have been forced either to employ intermittent extrusion or to produce an excessive amount of waste material. A further problem experienced with the above systems has been the impossibility of removing one of the components, e.g., a mold station, without halting the operation of the entire machine and thus losing the articles which ordinarily would be produced during the period of the shutdown.

In view of the shortcomings and difficulties of the methods and apparatus heretofore employed, it was totally unexpected and surprisingly to discover a new and improved method and apparatus which not only overcome the above problems, but also achieve production rates which are markedly faster than heretofore attainable.

In general, the present invention employs an extruder having a stationary extruder nozzle surrounded by a plurality of blow mold stations positioned radially outward from the stationary extruder and having means for further withdrawal radially outward as desired, for example, when maintenance is required. Cooperating with the plurality of blow mold stations and the extruder are a plurality of transfer means which are electronically interlocked to operate in proper sequence with respect to the whole system of mold stations and the extruder. Each transfer means includes an articulated arm having a pincher-like jaw at one end which grabs a newly formed parison from beneath the extruder nozzle and positions the parison within the cavity of a mold. The above-mentioned jaws also rotate the parison into a predetermined orientation relative to the mold. The orientation, which normally depends upon the position of the mold relative to the extruder nozzle, is required where parisons of non-circular cross-section are employed to produce noncircular articles.

The apparatus of the invention will be more fully described with reference to the accompanying drawings, in which.

Figure 1:
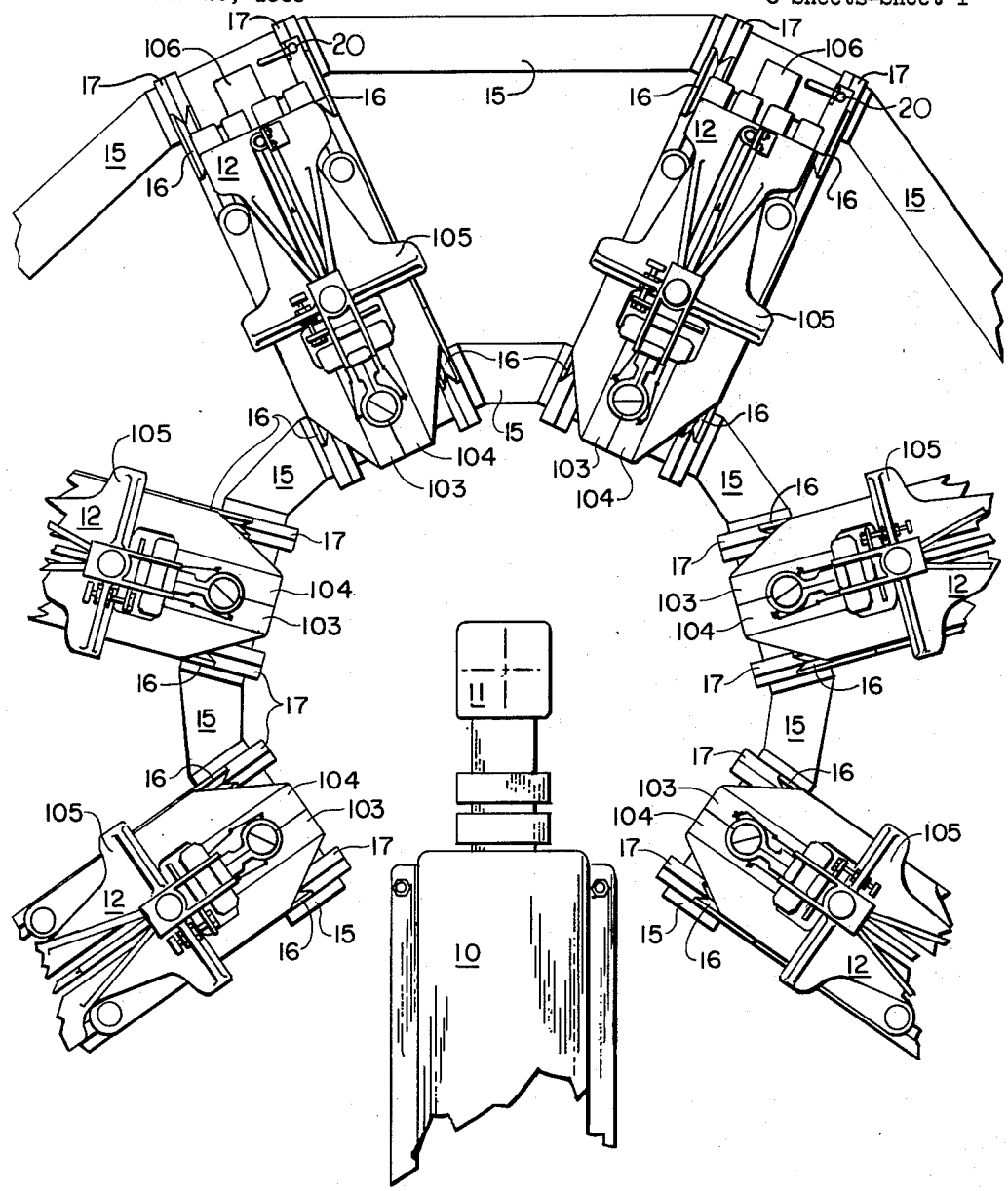
FIGURE 1 is a plan view of apparatus of the present invention.
Figure 2:
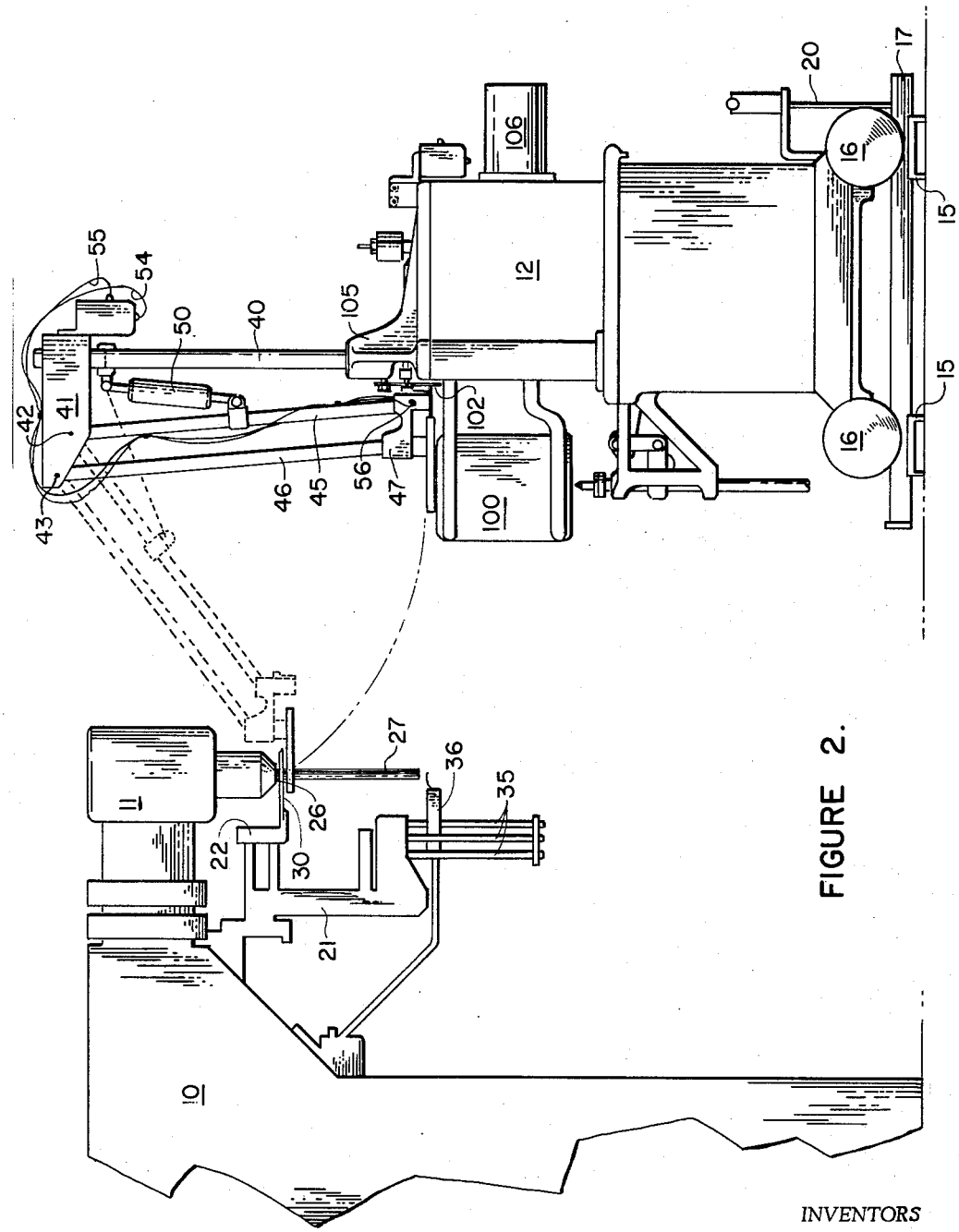
FIGURE 2 is a side view showing the extruder and one of the mold stations of FIGURE 1.
Figure 3:
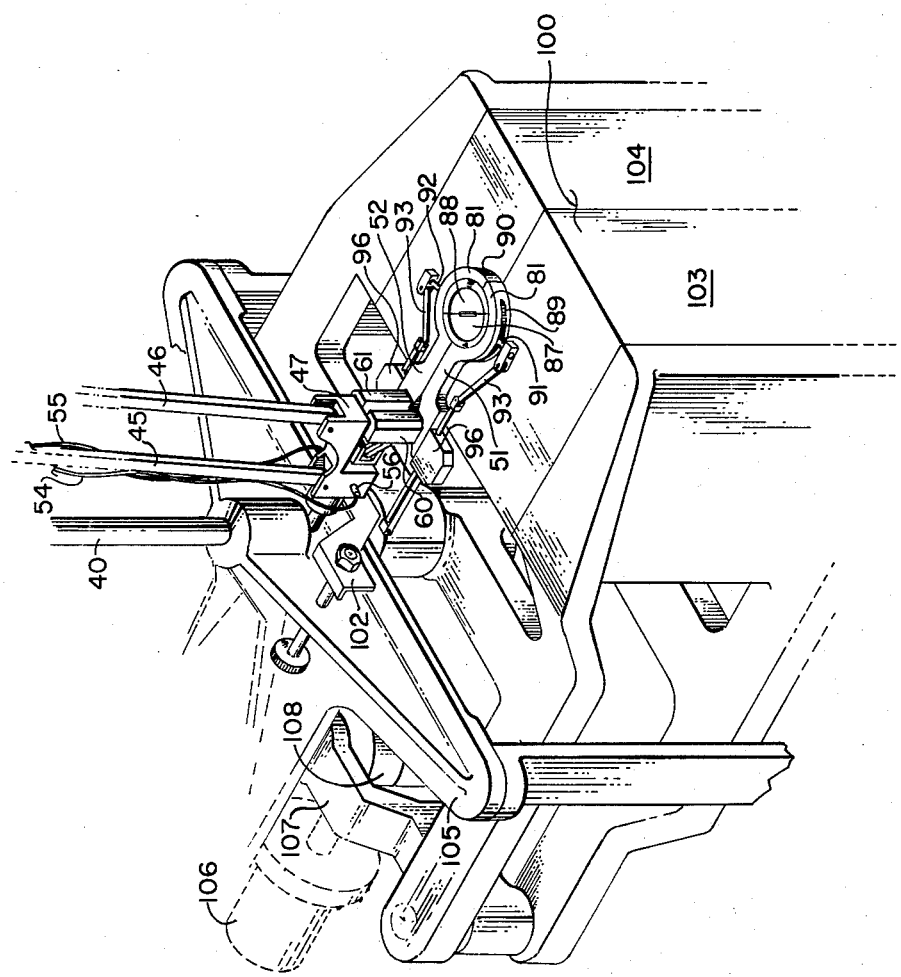
FIGURE 3 is an enlarged perspective view of a transfer arm assembly of the apparatus shown in FIGURE 1.

As shown in the drawings, a stationary extruder 10 having an extruder nozzle 11 is surrounded by a plurality of mold stations 12 which are spaced from the nozzle and positioned in a substantially circular pattern facing toward the nozzle. Each mold station 12 has wheels 16 secured to the lower portion thereof, which wheels are in contact with rails 17 radially carried by frame 15. Each mold station 12 may be firmly fixed upon the rails 17 by engagement of a rod 20 carried by the mold station, which rod passes through an appropriate opening in one of the rails 17.

A knife 30 is pivotably attached to a member 21 by a bracket 22, so as to reciprocate through a substantially horizontal arc and is positioned to pass in very close proximity to an annular orifice 26 of the extruder nozzle 11 and perpendicular to the direction of flow of extruded tubing 27.

On member 21 below the knife 30, a plurality of rods 35 are fastened extending downwardly from said bracket. Slidably attached to the rods 35 is a switch 36 which is vertically aligned with the flow of the extruded tubing 27. The switch 36, when triggered, actuates a double action air cylinder (not shown) which moves knife 30 pivotably connected thereto through its limited arc path below the nozzle 11.

A vertical support 40 projects upwardly from mold station 12 and has secured thereto a horizontal member 41 which extends toward extruder nozzle 11. Member 41 has pivot points 42 and 43 to which are attached a pair of movable parallel arms 45 and 46. These arms are pivotably joined at their opposite ends by a member 47 which holds arms 45 and 46 parallel throughout their arcuate movement so that member 47 is always horizontally disposed and parallel to the upper member 41. Thus, the combination of members 41 and 47 and arms 45 and 46 form a mechanical pantograph device. An air cylinder 50 is attached to support 40 and arm 46, and on directed impulse moves the pantograph assembly through the arc path.

A jaw structure comprising a pair of hinged jaws 51 and 52 is pivotably attached to the member 47 and moves with it through an arc path in a horizontal attitude. The movement of the jaws is in a short arc path about a vertical axis.

Figure 7:
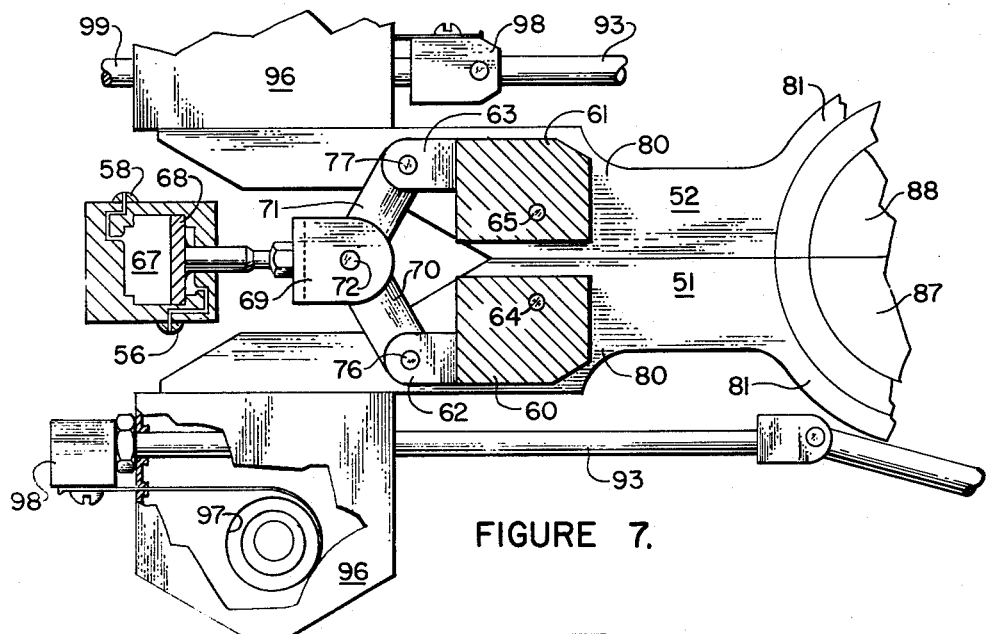
FIGURE 7 is a sectional view taken along line 7—7 of FIGURE 8.
Figure 8:
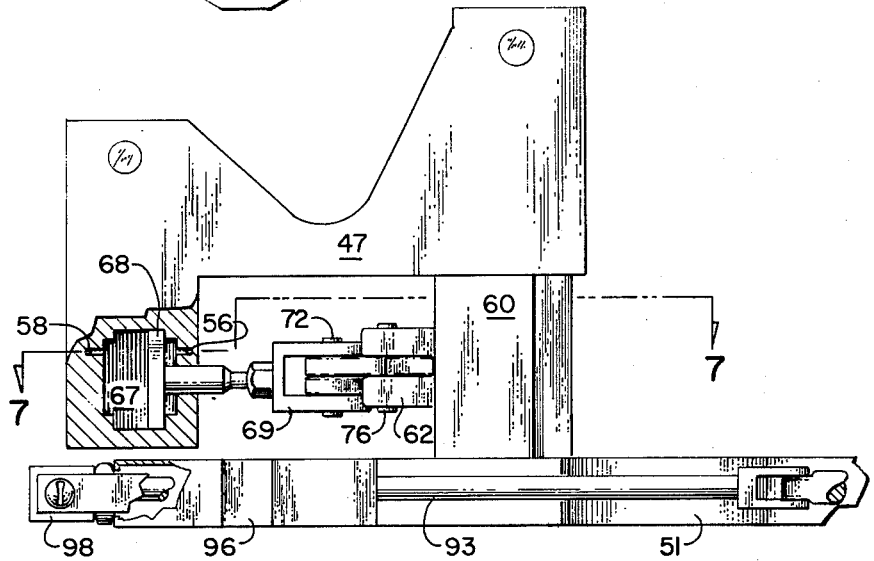
FIGURE 8 is a side view of a portion of the transfer assembly.

As shown in FIGURES 7 and 8, a pair of vertical supports 60 and 61 having extensions 62 and 63 thereon are securely fastened to each of the hinged jaws 51 and 52. Each support is pivotably attached to member 47 by pins 64 and 65. Located in a cavity 67 in a depending portion of member 47 is a piston 68 forming with the cavity a double action air cylinder. Fittings 56 and 58 located at opposite sides of the cavity 67 admit air supplied through hoses 54 and 55 alternately into each end of the cavity when switch 57 is actuated.

The end of piston 68 is pivotably attached to connector 69 which is pivotally attached to links 70 and 71 by means of pin 72. The links are likewise pivotally attached at their opposite ends to the extensions 62 and 63 of the vertical supports 60 and 61 by means of pins 76 and 77 respectively.

Thus, the hinged jaws 51 and 52 will be parted or opened when connector 69 and piston 68 move away from the hinged jaws. This movement is affected by permitting air to enter cavity 67 through fitting 56. When the movement of the piston 68 is reversed by the delivery of air into the portion of the cavity 67 on the other side of piston 68 through fitting 58, hinged jaws 51 and 52 will move toward each other around their pivot pins 64 and 65.

Each hinged jaw 51 and 52 comprises an elongated portion 80 terminating in a semicircular portion 81. Semicircular plates 87 and 88 are slidably mounted in the pair of semicircular portions 81 and rotate within their own plane. Peripheral slots 89 and 90 are cut in portions 81 and carry bolts 91 and 92 which are connected to plates 87 and 88. The bolts 91 and 92 are attached to rod assemblies 93, one at the side of each elongated member. As shown in FIGURE 7, each rod assembly 93 passes through a housing 96 which is also mounted on the elongated member 80 and which contains a spring assembly tending to hold each of the plates 87 and 88 in a fixed angular position within its mounting. Each spring assembly comprises a coiled spring 97 mounted within the housing 96 and so attached to each rod assembly 93 as to exert a force against any displacement of the rod. The position of the rod assembly can be changed by means of a clamp 98 adjustably secured on the rod 93.

Figure 6:
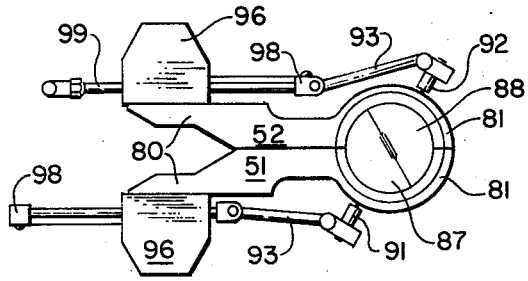
FIGURES 4, 5 and 6 are plan views of a parison orienter of the transfer arm assembly shown in FIGURE 3.
Figure 5:
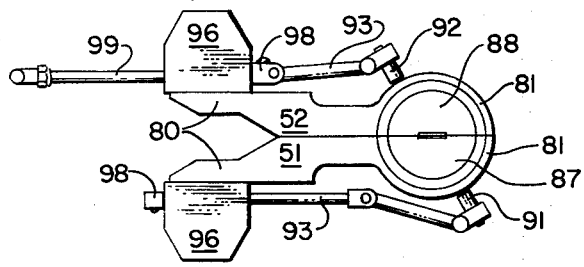
Figure 4:
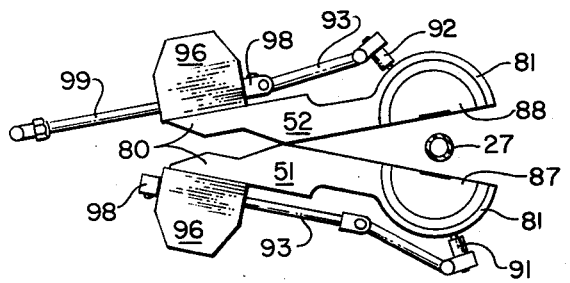

In contrast, the rod assembly 99 extends through said housing a greater distance so that, when the motion of the transfer arm moves the jaws 51 and 52 toward the mold, the rod extension 99 will abut an adjustable stop 102 mounted above the blow mold. Thus, force is exerted on the rod extension 99 by the stop 102 thereby imparting angular displacement to the plate 87 which in turn displaces the other plate 88 overcoming the positioning tendency of the pair of coiled springs 97. In this manner, a parison held between the plates 87 and 88 in a position as shown in FIGURE 5 would be rotated about its longitudinal axis to a position as shown in FIGURE 6. When the transfer arm assembly is moved away from the mold station, the spring assembly will return plates 87 and 88 to their original positions.

Positioned vertically below jaws 51 and 52 when the pantograph assembly is at the lowermost extremity of its arc path are the mold halves 103 and 104 which are pivotally mounted, swinging on a vertical axis on frame 105 and actuated by an air cylinder 106. The air cylinder is located behind the support 40 and attached by lever arms 107 and 108 to the mold halves 103 and 104.

Figure 9:
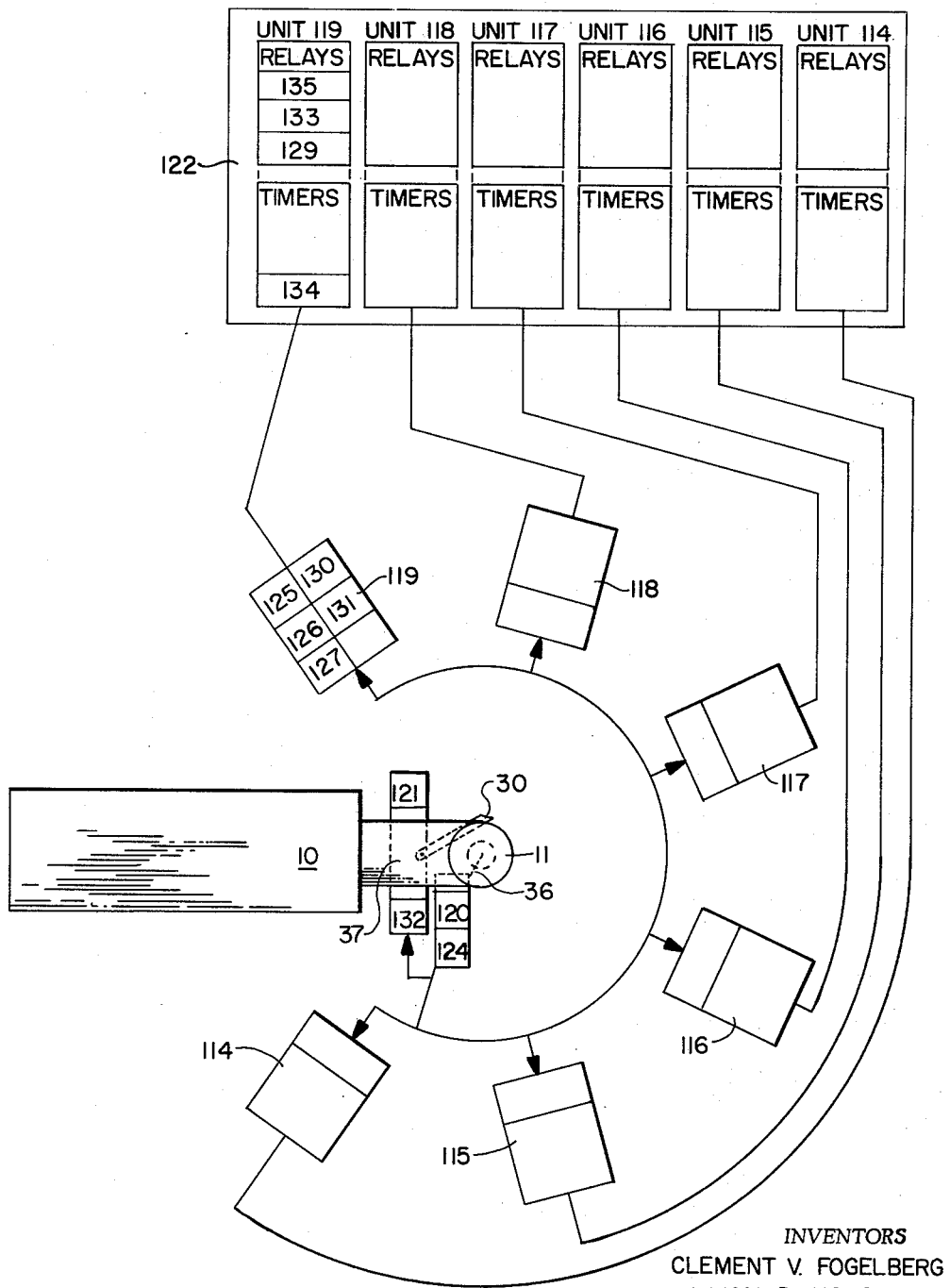
FIGURE 9 is a schematic showing the relationship of control apparatus to the apparatus shown in FIGURE 1.

FIGURE 9 shows schematically one form of control system for the apparatus of the invention. As shown in the drawings, the apparatus is controlled automatically by an arrangement of components including electronic interlocks or relays, and timers.

The solid black lines in FIGURE 9 are not intended to represent single wires, but rather represent lines of control and are intended to designate a sufficient number of wires to connect the various devices hereinafter described.

As previously described, the extruder 10 with attached extruder nozzle 11 having an orifice therein is surrounded by a plurality of mold stations 114, 115, 116, 117, 118, and 119, six being shown. Located beneath the extruder nozzle is a control box 121 operably connected to the knife 30. A second control box 120 is operably connected to switch 36 and to controls located at each one of the mold stations. In turn, each mold station is connected to a control panel 122 which is divided into a series of units, one for each mold station. Each control unit has two sections, one containing a timer and the other containing relays which are actuated by the timer.

In operation, a hollow plastic tube which is continuously extruded downwardly from the extruder nozzle 11 contacts switch 36 positioned on rods 35 at a predetermined point to permit cutting of the tube into a desired length to form a parison 27. The switch 36 is arranged to also actuate the hinged jaws 51 and 52 of the transfer arm assembly as it is extended or is raised to a point below the extruder nozzle 11. Thus, actuation of switch 36 energizes the coil of a length relay 124 which closes, energizing the coil of a jaw relay 125 which energizes a jaw solenoid 126 operably connected to the jaws 51 and 52 of the extended transfer arm. The function of the jaw solenoid 126 is to actuate a valve 127 to allow air to flow through hose 55 to air cylinder 57, thus closing the jaws 51 and 52 around the upper end of the parison.

The transfer arm assembly then moves into position over its respective open mold 100, at the same time sending a signal to the next mold station to cause its transfer arm to be extended with the jaws grabbing the next succeeding parison when it is extruded and cut. To accomplish this, a delay relay 129 breaks the circuit to an arm solenoid 130 of the station whose arm is extended, thus actuating a valve 131 to allow air to flow to an arm air cylinder 50, and lowering the transfer arm. The delay relay 129 also energizes a cutter solenoid 132 through a toggle relay 133 thus allowing air to flow through a valve (not shown) to operate the cutter cylinder 37, cutting the parison. As the transfer arm assembly carries the parison into position above the respective mold and after a predetermined time interval set on a delay relay timer 134, a control relay 135 closes, energizing an arm solenoid 130 of the next mold station which allows air to flow to its arm air cylinder thus raising its transfer arm.

The above operations of cutting the parison, grabbing the upper end of the parison, and dropping of the transfer arm, all occur in such a short interval as to be practically simultaneous. Preferably, the parison is cut immediately prior to the action of the grabbing jaws and the transfer arm is subsequently lowered. It should also be noted that the arm of the second mold station will not raise until its mold 100 has opened and completed its previous cycle. Thus, the opening of the mold closes a circuit which allows the transfer arm to extend as signaled by the previous arm.

When the arm moves into its downward or retracted position above the mold, it signals a timer located in the control unit for that station to begin the sequential operation of the relays also located in the control unit of that station which actuate the various elements of each mold station to perform their specific function. Each timer is equipped with vernier adjustments to set the times for closing and opening each of the contacts of the timers, as it goes through the blowing cycle required for a particular bottle. A typical timer may have the following five sets of contacts:

(1) A first set to determine the total cycle time available for the blowing process of a particular station.

(2) A second set to energize a mold solenoid which passes air to a mold cylinder and closes the mold sections.

(3) A third set to allow air to pass to a blow stick cylinder, raising the blow stick.

(4) A fourth set to energize a solenoid to deliver air at a low pressure for the initial blowing of the bottle.

(5) A fifth set to energize another solenoid to deliver air at a higher pressure for the final blowing.

As the mold sections open, the transfer arm assembly moves to an extended position and the station is ready for its next cycle. As the transfer arm rises, the jaw solenoid 126 is de-energized and the air is introduced into the opposite end of the jaw cylinder 57, opening the hinged jaws 51 and 52 and letting the blown bottle drop.

When the transfer arm again reaches its up or fully extended position, the machine is ready for its next cycle.

The above description shows that the method and apparatus of the present invention provide a simple and convenient means for producing hollow plastic articles such as containers and bottles at a substantially higher rate than has heretofore been possible. Moreover, the novel method and apparatus of the invention permit the production of plastic containers and bottles by an automatic process employing continuous extrusion.

From the above description of the invention, it will be apparent that various modifications in the apparatus and procedure described in detail herein, may be made within the scope of the invention. For example, the number and spacing of the mold stations may be increased or decreased. Also, the transfer arm assembly may be of a different design and operate in a different manner, the important factor being that the parison is transferred from a stationary extruder nozzle outwardly to a number of mold stations positioned in different directions from the extruder nozzle. Therefore, the invention is not intended to be limited to the specific details of procedure and apparatus described herein except as may be required by the following claims.

What we claim is:

1. Apparatus for manufacturing hollow articles from thermoplastic material, comprising a stationary extruder having a stationary extruder nozzle for continuously extruding hollow thermoplastic tubing, cutting means positioned adjacent said extruder nozzle for severing parisons from said tubing, a plurality of mold stations radially positioned around the extruder nozzle, each of said mold stations comprising a sectional mold mounted for movement from an open to a closed position, independent transfer means for each mold station having a parison grasping portion movable from a position adjacent its respective mold station to a common loading position for engagement of a severed parison by said grasping portion, and means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common position to a position within the open sectional mold of the respective mold station of said transfer means for expansion into hollow articles by the blow molding process, whereby rapid and continuous production of hollow plastic articles is obtained with the output from a single continuously operating extruder.

2. Apparatus for manufacturing hollow articles from thermoplastic material, comprising a stationary extruder having a stationary extruder nozzle for continuously extruding hollow thermoplastic tubing, cutting means positioned adjacent said extruder nozzle for severing parisons from said tubing, a plurality of mold stations radially positioned around the extruder nozzle, each of said mold stations comprising a sectional interchangeable mold mounted for movement from an open to a closed position, independent transfer means for each mold station having a parison grasping portion movable from a position adjacent its respective mold station to a common loading position for engagement of a severed parison by said grasping portion, and means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common position to a position within the open sectional mold of the respective mold station of said transfer means for expansion into hollow articles by the blow molding process, and control means operatively connected to each of said mold stations, transfer means, and cutting means to cooperatively vary the timing thereof, whereby rapid and continuous production of hollow plastic articles of many different sizes and shapes can be obtained with a single continuously operating extruder and a plurality of interchangeable molds.

3. Apparatus for manufacturing hollow articles from thermoplastic material, comprising a stationary extruder having a stationary extruder nozzle for continuously extruding hollow thermoplastic tubing, said tubing having a non-circular cross-section, cutting means positioned adjacent said extruder nozzle for severing parisons from said tubing, a plurality of mold stations radially positioned around the extruder nozzle, each of said mold stations comprising a sectional mold mounted for movement from an open to a closed position, independent transfer means for each mold station having a parison grasping portion movable from a position adjacent its respective mold station to a common loading position for engagement of a severed parison by said grasping portion, means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common position to a position within the open sectional mold of the respective mold station of said transfer means for expansion into hollow articles by the blow molding process, rotating means arranged to rotate said parison about its longitudinal axis into a predetermined orientation within the open sectional mold after it has been grasped at said common loading position and while it is being transferred to said mold, the amount of rotation being directly proportional to the angle between the radial position of said mold station and the longitudinal axis of said extruder, whereby rapid and continuous production of hollow plastic articles is obtained with the output from a single continuously operating extruder.

4. Apparatus for manufacturing hollow articles from thermoplastic material, comprising a stationary extruder having a stationary extruder nozzle for continuously extruding hollow thermoplastic tubing, said tubing having a non-circular cross-section, cutting means positioned adjacent said extruder nozzle for severing parisons from said tubing, a plurality of mold stations radially positioned around the extruder nozzle, each of said mold stations comprising a sectional interchangeable mold mounted for movement from an open to a closed position, independent transfer means for each mold station having a parison grasping portion movable from a position adjacent its respective mold station to a common loading position for engagement of a severed parison by said grasping portion, means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common position to a position within the open sectional mold of the respective mold station of said transfer means for expansion into hollow articles by the blow molding process, rotating means arranged to rotate said parison about its longitudinal axis into a predetermined orientation within the open sectional mold after it has been grasped at said common loading position and while it is being transferred to said mold, the amount of rotation being directly proportional to the angle between the radial position of said mold station and the longitudinal axis of said extruder, and control means operatively connected to each of said mold stations, transfer means, and cutting means to cooperatively vary the timing thereof, whereby rapid and continuous production of hollow plastic articles of many different sizes and shapes can be obtained with a single continuously operating extruder and a plurality of interchangeable molds.

5. Apparatus for manufacturing hollow articles from thermoplastic material, comprising a stationary extruder having a stationary extruder nozzle for continuously downwardly extruding hollow thermoplastic tubing, cutting means positioned immediately below said extruder nozzle to sever parisons from said tubing while leaving the end of said tubing open, a plurality of mold stations equidistant from and radially positioned around, the extruder nozzle in a common plane substantially perpendicular to the longitudinal axis of said tubing, each of said mold stations including a sectional mold mounted for movement from an open to a closed position, and means to expand a parison into a hollow article by the blow molding process, independent transfer means for each mold station having a parison grasping and sealing portion movable in a single plane from a position adjacent its respective mold station to a common loading position for engagement of the upper end of a severed parison by said grasping and sealing portion, and means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common loading position to a position within the open sectional mold of the respective mold station of said transfer means for expansion into hollow articles by the blow molding process, whereby rapid and continuous production of hollow plastic articles is obtained with the output from a single continuously operating extruder.

6. Apparatus for manufacturing hollow articles from thermoplastic material, comprising a stationary extruder having a stationary extruder nozzle for continuously downwardly extruding hollow thermoplastic tubing, said tubing having an elongated cross-section, cutting means positioned immediately below said extruder nozzle to sever parisons from said tubing while leaving the end of said tubing open, a plurality of mold stations equidistant from and radially positioned around, the extruder nozzle in a common plane substantially perpendicular to the longitudinal axis of said tubing, each of said mold stations including a sectional mold mounted for movement from an open to a closed position, and means to expand a parison into a hollow article by the blow molding process, independent transfer means for each mold station having a parison grasping and sealing portion movable in a single plane from a position adjacent its respective mold station to a common loading position for engagement of the upper end of a severed parison by said grasping and sealing portion, and means actuating each transfer means in cooperative timed relationship with respect to operation of said cutting means, operation of said transfer means and of the respective molds of the other mold stations, and operation of the mold of its own mold station to transfer parisons successively, sequentially, and swiftly from said common loading position to a position within the open sectional mold of the respective mold station of said transfer means for expansion into hollow articles by the blow molding process, rotating means arranged to rotate said parison about its longitudinal axis through an angle directly proportional to the angle between the radial position of said mold station and the major axis of the elongated cross-section of said tubing into a predetermined orientation within the open sectional mold after it has been grasped at said common loading position and while it is being transferred to said mold, and control means including a series of timers, relays and solenoids cooperatively interconnecting each of said mold stations, transfer means, and cutting means to successively and sequentially operate said transfer means, and said cutting means, and said mold stations in a predetermined order, and to cooperatively vary the timing thereof, whereby rapid and continuous production of hollow plastic articles of many different sizes and shapes can be obtained with a single continuously operating extruder and plurality of interchangeable molds.

7. Apparatus for rotating a parison through an angle about its longitudinal axis, which parison has a cross-section other than circular, and while the parison is being transferred by transfer means from an extruder nozzle to a blow mold having a cavity with a cross-section other than circular for expansion into a plastic article by the blow molding process, the rotation being directly proportional to the angle between a given axis of the cross-section of said parison and a corresponding axis of the cross-section of the cavity within a blow mold, comprising first and second jaws carried by said transfer means and second semicircular plates slidably and cooperatively movable from an open to a closed position, first and mounted one within each of said jaws with abutting flat edges when said jaws are in a closed position, first and second rods laterally disposed on the outside of each of said jaws, respectively, and attached to one of each of said plates, respectively, said first rod being spring-mounted and aligned to urge said first plate into a fixed angular position and cooperatively to urge said second plate into a corresponding position, said second rod being aligned to about a pre-set stop on the blow mold when said jaws and said transfer means approach said blow mold, to exert a force against and impart angular displacement to said second plate in turn displacing said first plate and overcoming the force exerted by said spring-mounted first rod, whereby the parison grasped between said plates is rotated to a desired orientation within said blow mold.

8. Apparatus for rotating a parison through an angle about its longitudinal axis which parison has a cross-section other than circular and while the parison is being transferred by transfer means from an extruder nozzle to a blow mold having a cavity with a cross-section other than circular for expansion into a plastic article by the blow molding process, the rotation being directly proportional to the angle between a given axis of the cross-section of said parison and a corresponding axis of the cross-section of the cavity within a blow mold, comprising first and second semicircular jaws carried by said transfer means in a fixed plane and movable from an open to a closed position, said jaws enclosing a circular opening therebetween larger than the greatest dimension of the cross-section of said parison and having semicircular slots cut into each of said jaws from inside facing edges of said jaws, first and second semicircular plates slidably recessed in said slots within the facing edges of said jaws with abutting flat edges when said jaws are in a closed position, first and second rods laterally disposed on the outside of each of said jaws, respectively, parallel to each other, and radially attached to one of each of said plates, respectively, said first rod being spring-mounted and aligned to urge said first plate to rotate within said semicircular slot within said first jaw into a fixed angular position and cooperatively to urge said second plate to rotate within said semicircular slot within said second jaw into a corresponding position, said second rod being aligned to abut a pre-set stop on the blow mold when said jaws and said transfer means approach said blow mold, to exert a force against and impart angular displacement to said second plate in turn angularly displacing said first plate and overcoming the force exerted by said spring-mounted first rod whereby a parison grasped between said plates is rotated to a desired orientation.

9. Apparatus for transferring parisons from a first position beneath an extruder nozzle radially downward and outward in an arcuate path to a second position between the parted halves of an open blow mold for subsequent expansion into hollow articles by means of the blow molding process, comprising parison grasping means arranged to seize a parison produced at said first position at its upper end, a transfer arm having one end pivotably connected to said grasping means and the other end hinged to a point remote from said first position and said second position, said arm being movable through an arcuate path in a substantially vertical plane and arranged to move said grasping means rapidly from said first position to said second position while maintaining said grasping means in a fixed plane, and actuating means to move said transfer arm in cooperative timed relationship with respect to production of parisons at said first position and operation of said blow mold.

10. Apparatus for successively and sequentially transferring parisons from a first position beneath an extruder nozzle radially downward and outward in an arcuate path to a second position between the parted halves of an open blow mold for subsequent expansion into hollow articles by means of the blow molding process, comprising parison grasping jaws, actuating means connected to said jaws and arranged to open and close said jaws, a transfer arm having one end pivotably connected to said grasping jaws and the other end hinged at a point remote from said first position and said second position, said arm being movable through an arcuate path in a substantially vertical plane and arranged to move said grasping jaws rapidly from said first position to said second position while maintaining said grasping jaws in a fixed plane, said grasping jaws being aligned to grip the upper end of each parison produced at said first position when said arm is in said first position, and transfer arm actuating means to move said transfer arm in cooperative timed relationship with respect to production of parisons at said first position and operation of said blow mold.

References Cited by the Examiner

UNITED STATES PATENTS

| | | | |
|---|---|---|---|
| Re. 18,133 | 7/1931 | Westin | 214—1 |
| 1,958,846 | 5/1934 | Christensen | 214—313 |
| 2,783,503 | 3/1957 | Sherman | 18—30 |
| 2,811,266 | 10/1957 | Udal | 214—1 |
| 2,996,782 | 8/1961 | Kovach et al. | 25—1 |
| 3,069,722 | 12/1962 | Kato | 18—5 |
| 3,072,240 | 1/1963 | Allgeyer | 214—1 |
| 3,080,614 | 3/1963 | Adams. | |
| 3,081,489 | 3/1963 | Jackson et al. | 18—5 |
| 3,082,484 | 3/1963 | Sherman. | |
| 3,112,522 | 12/1963 | Doyle | 214—1 |
| 3,145,243 | 8/1964 | Hagen | 264—98 |

FOREIGN PATENTS

| | | |
|---|---|---|
| 1,277,268 | 10/1961 | France. |

J. SPENCER OVERHOLSER, *Primary Examiner.*

MORRIS LIEBMAN, ROBERT F. WHITE, WILLIAM J. STEPHENSON, *Examiners.*